(12) United States Patent
Jang et al.

(10) Patent No.: US 7,796,378 B2
(45) Date of Patent: Sep. 14, 2010

(54) PANEL TYPE DISPLAY DEVICE

(75) Inventors: Se Ki Jang, Hwaseong-si (KR); Ki Hyub Sung, Suwon-si (KR); Jun Su Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 153 days.

(21) Appl. No.: 12/247,372

(22) Filed: Oct. 8, 2008

(65) Prior Publication Data

US 2009/0185341 A1    Jul. 23, 2009

(30) Foreign Application Priority Data

Jan. 19, 2008    (KR) .................... 10-2008-0005939

(51) Int. Cl.
G06F 1/16    (2006.01)
(52) U.S. Cl. .................. 361/679.22; 345/213; 174/393; 428/141; 349/156
(58) Field of Classification Search .................. 348/843, 348/58; 345/213, 94, 89, 174, 156, 102; 349/141, 58, 147, 156; 361/679.02, 679.21, 361/679.22, 679.27, 679.29, 704, 708; 174/38, 174/381, 393, 389; 428/432, 483, 141; 430/315, 430/270.1
See application file for complete search history.

(56) References Cited

U.S. PATENT DOCUMENTS

| | | | |
|---|---|---|---|
| 6,256,075 B1 * | 7/2001 | Yang | 348/843 |
| 7,190,361 B2 * | 3/2007 | Igarashi et al. | 345/213 |
| 7,304,708 B2 * | 12/2007 | Ono et al. | 349/141 |

FOREIGN PATENT DOCUMENTS

KR    20060071052    6/2006

* cited by examiner

*Primary Examiner*—Hung V Duong
(74) *Attorney, Agent, or Firm*—Stanzione & Kim, LLP

(57) ABSTRACT

A panel type display device to achieve easy assembly, high productivity and low manufacturing costs with a reduced number of elements. The panel type display device includes a display panel, electronic elements arranged at a rear side of the display panel, an electromagnetic-wave shield cover to receive the electronic elements, a front case and a rear case coupled with each other to receive the display panel, electronic elements and electromagnetic-wave shield cover, a plurality of panel supporting pieces provided at at least one of the front case and rear case to support the display panel, at least one supporting member extending from the electromagnetic-wave shield cover and supported by at least one of a rim of the display panel and an inner surface of the rear case to determine an assembling position of the electromagnetic-wave shield cover, and a plurality of cover supporting pieces provided at the inner surface of the rear case to support the electromagnetic-wave shield cover without movements while pushing it toward a rear surface of the display panel.

22 Claims, 9 Drawing Sheets

PANEL TYPE DISPLAY DEVICE

CROSS-REFERENCE TO RELATED APPLICATIONS

This application claims the benefit of Korean Patent Application No. 2008-0005939, filed on Jan. 19, 2008 in the Korean Intellectual Property Office, the disclosure of which is incorporated herein by reference in its entirety.

BACKGROUND OF THE INVENTION

1. Field of the Invention

The present general inventive concept relates to a panel type display device, and, more particularly, to a panel type display device to achieve easy assembly and a simplified manufacturing process.

2. Description of the Related Art

A panel type display device includes a flat plate-shaped display module, upon which an image is formed, such as a Liquid Crystal Display (LCD) or Plasma Display Panel (PDP), and therefore, has advantages being relatively thin and lightweight, as compared to a conventional CRT display device.

A conventional panel type display device includes a body and an external supporting device to support the body. The body incorporates a flat-plate-shaped display module, upon which an image is formed, a circuit board to operate a display panel, electric elements such as a power source, etc., an electromagnetic-wave shield cover to cover the electric elements, and front and rear cases to receive and protect the previously described elements, the front and rear cases defining the exterior appearance of the body. The supporting device allows a user to place the body on a table or to anchor the body to a wall, etc., for convenient use of the display device.

To assemble the above-described display device, first, the display module, electric elements, electromagnetic-wave shield cover, etc., are fixedly anchored, respectively, inside the front case or rear case by means of a number of fixing screws. Both the front case and rear case are also coupled to each other via fastening of a number of fixing screws. The coupling of the supporting device and the body is similarly accomplished via fastening of fixing screws.

The above-described conventional display device requires fastening of a multiplicity of fixing screws to assemble the elements thereof, and therefore, has problems of requiring a large number of elements and having a complicated assembly process between the respective elements. As a result, the conventional panel type display device limits productivity and has high manufacturing costs.

SUMMARY OF THE INVENTION

The present general inventive concept provides a panel type display device, which has a reduced number of elements and a simplified assembly process, thereby achieving high productivity and low manufacturing costs.

Additional aspects and/or utilities of the present general inventive concept will be set forth in part in the description which follows and, in part, will be obvious from the description, or may be learned by practice of the general inventive concept.

The foregoing and/or other aspects and utilities of the present general inventive concept can be achieved by the provision of a panel type display device including: a display panel; electric elements arranged at a rear side of the display panel; an electromagnetic-wave shield cover to receive the electronic elements; a front case and a rear case coupled with each other, to receive the display panel, electronic elements, and electromagnetic-wave shield cover; a plurality of panel supporting pieces provided at at least one of the front case and rear case, to support the display panel; at least one supporting member extending from the electromagnetic-wave shield cover and supported by at least one of a rim of the display panel and an inner surface of the rear case, to determine an assembling position of the electromagnetic-wave shield cover; and a plurality of cover supporting pieces provided at the inner surface of the rear case to support the electromagnetic-wave shield cover without movements while pushing it toward a rear surface of the display panel.

The device may further include: a plurality of case couplers provided at rims of the front case and rear case to allow the front case and rear case to be caught by and coupled to each other.

The plurality of case couplers may include coupling protrusions provided at one of the front case and rear case, and coupling recesses provided at the other one of the front case and rear case to be caught by the coupling protrusions.

The plurality of panel supporting pieces may protrude from an inner surface of a rim portion of at least one of the front case and rear case to support the rim of the display panel.

The electromagnetic-wave shield cover may have a box shape internally defining a space to receive the electronic elements, and the electronic elements may be anchored in the electromagnetic-wave shield cover via fastening of a plurality of fixing screws.

The electronic elements may include at least one circuit board and at least one power source, each of the circuit board and power source may have at least one connection port formed at a lower position thereof for connection of at least one external cable, and each of the electromagnetic-wave shield cover and rear case may have at least one opening formed at a position corresponding to the connection port.

A portion of the rear case near the connection port may be bent forward by a predetermined depth to define a dented portion.

The device may further include: at least one connecting cable to connect the electronic elements to the display panel; and at least one cable cover to cover the connecting cable in order to intercept electromagnetic-waves around the connecting cable, and the electronic elements may include at least one circuit board and at least one power source.

The device may further include: at least one auxiliary connection port installed inside the rear case toward at least one of the main surface and lateral surface of the rear case for connection of an external cable, the auxiliary connecting port being linked with the electric elements; and a connection port supporting member extending from the electromagnetic-wave shield cover to support the auxiliary connection port, and the rear case may have at least one opening formed at a position corresponding to the auxiliary connection port.

The plurality of cover supporting pieces may protrude from the inner surface of the rear case to support a rear surface rim portion of the electromagnetic-wave shield cover.

The foregoing and/or other aspects and utilities of the present general inventive concept can also be achieved by the provision of a panel type display device including: a body; and an external supporting device to support the body, wherein the body includes a display panel; electronic elements arranged at a rear side of the display panel; an electromagnetic-wave shield cover to receive the electronic elements; a front case and a rear case coupled with each other to receive the display panel, electronic elements, and electromagnetic-wave shield cover; and at least one supporting member extending from the electromagnetic-wave shield cover and supported by at least one of a rim of the display panel and an inner surface of the rear case to determine a fixing position of the electromagnetic-wave shield cover.

The external supporting device may include a stand, a base coupled to a lower end of the stand, and a connector extending from an upper end of the stand, the connector being configured to be introduced inside the rear case so as to be coupled to the supporting member.

The connector may have a flat-plate shape having at least one insertion hole, and the supporting member may extend downward from a lower end of the electromagnetic-wave shield cover, and include coupling rails provided at both sides thereof, respectively, to support both sides of the connector while guiding a coupling of the connector, and an elastically deformable insert to be introduced into and caught by the insertion hole when completing the coupling of the connector.

The base may be anchored to the lower end of the stand by fastening at least one fixing screw.

The rear case may include a plurality of coupling holes to mount the external supporting device, and at least one reinforcing plate coupled to the inner surface of the rear case and having screw-fastening holes formed at positions corresponding to the coupling holes.

The foregoing and/or other aspects and utilities of the present general inventive concept can also be achieved by the provision of a panel type display device including a display panel; an electromagnetic-wave shield to cover electric elements disposed at a back portion of the display panel; a front case to receive the display panel in an opening thereof, the front case having panel supporting pieces disposed around the opening thereof to support the display panel from movements within the opening and coupling protrusions extending therefrom; and a rear case including coupling recesses disposed along an outer periphery thereof to engage with and couple to the coupling protrusions and cover support pieces extending from a front portion thereof to surround and support the electromagnetic-wave shield when the rear case couples to the front case.

The panel type display device may further include at least one supporting member extending from the electromagnetic-wave shield cover and supported by at least one of a rim of the display panel and an inner surface of the rear case to determine an assembling position of the electromagnetic-wave shield cover.

The at least one supporting member may further include a bent portion at a lower end thereof to engage with a lower end of the display panel to determine an assembling position of the electromagnetic-wave shield cover and a coupling device to couple with a supporting device.

The panel type display device may further include an external supporting device including a base, and a stand extending from the base, the stand including a connector extending from the stand to engage with and couple to the coupling device and an insertion hole.

The coupling device may include a pair of vertically-elongated coupling rails to engage with the connector of the stand and an insert disposed between the vertically-elongated coupling rails to be inserted into the insertion hole to fixedly position the stand with respect to the at least one supporting member.

BRIEF DESCRIPTION OF THE DRAWINGS

These and/or other aspects and utilities of the exemplary embodiments of the present general inventive concept will become apparent and more readily appreciated from the following description of the embodiments, taken in conjunction with the accompanying drawings, of which.

DETAILED DESCRIPTION OF THE PREFERRED EMBODIMENTS

Figure 1:
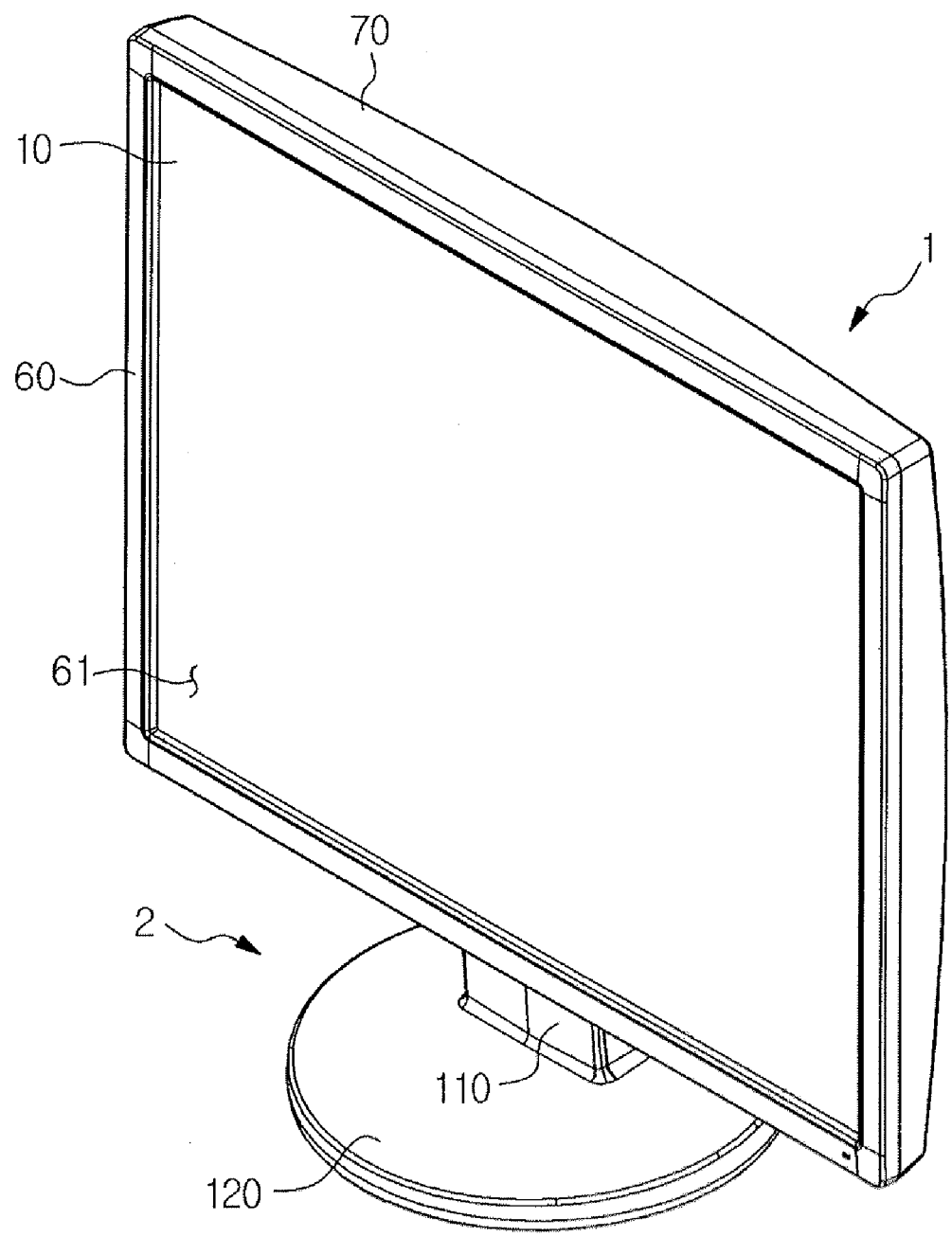
FIG. 1 is a perspective view illustrating a panel type display device according to an embodiment of the present general inventive concept.

Reference will now be made in detail to exemplary embodiments of the present general inventive concept, examples of which are illustrated in the accompanying drawings, wherein like reference numerals refer to like elements throughout. The embodiments are described below to explain the present general inventive concept by referring to the figures.

Figure 2:
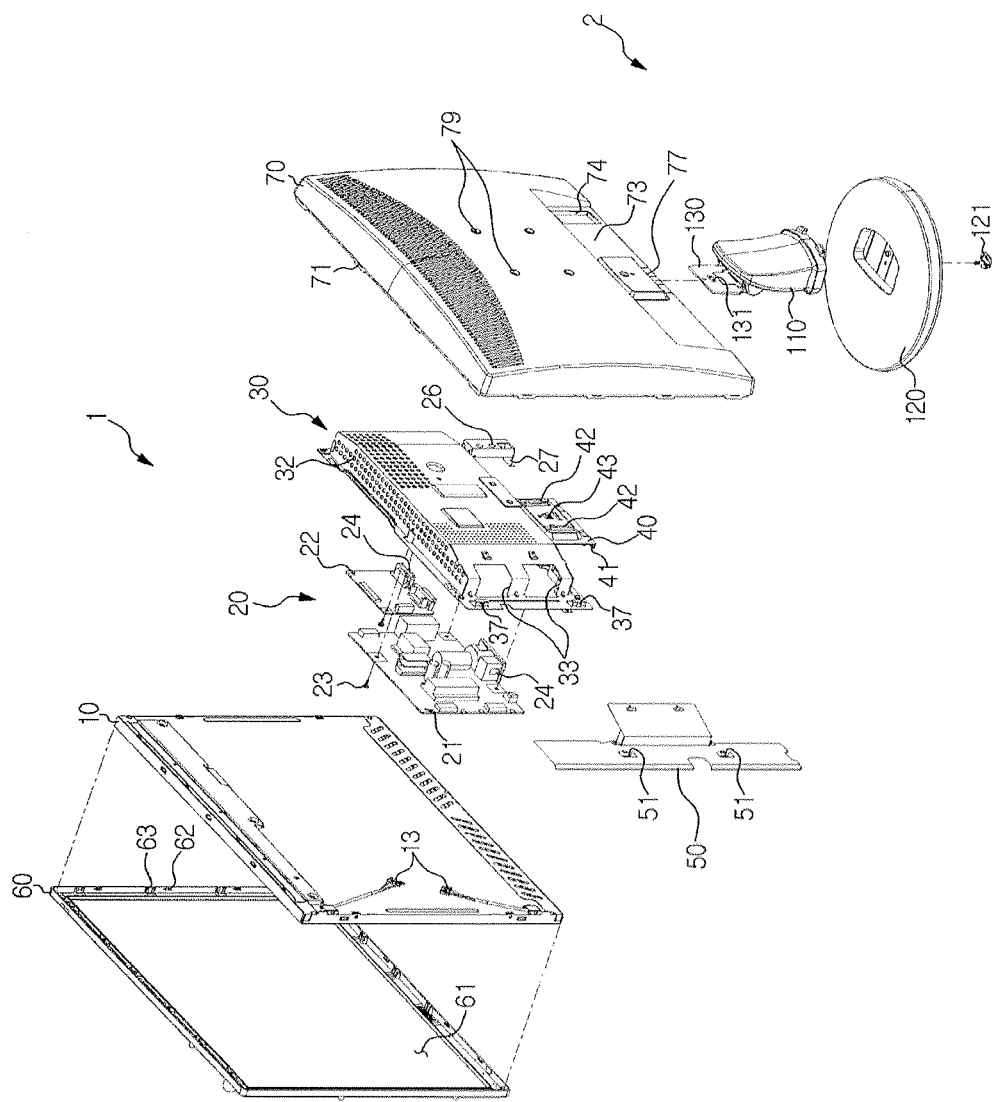
FIG. 2 is an exploded perspective view of the display device of FIG. 1.

FIG. 1 is a perspective view illustrating a panel type display device according to an embodiment of the present general inventive concept, and FIG. 2 is an exploded perspective view of the display device of FIG. 1. As illustrated, the panel type display device according to the present embodiment includes a body 1, and an external supporting device 2 to support the body 1 to permit use of the body 1 on a table, etc., the external supporting device 2 being separable from the body 1.

Figure 3:
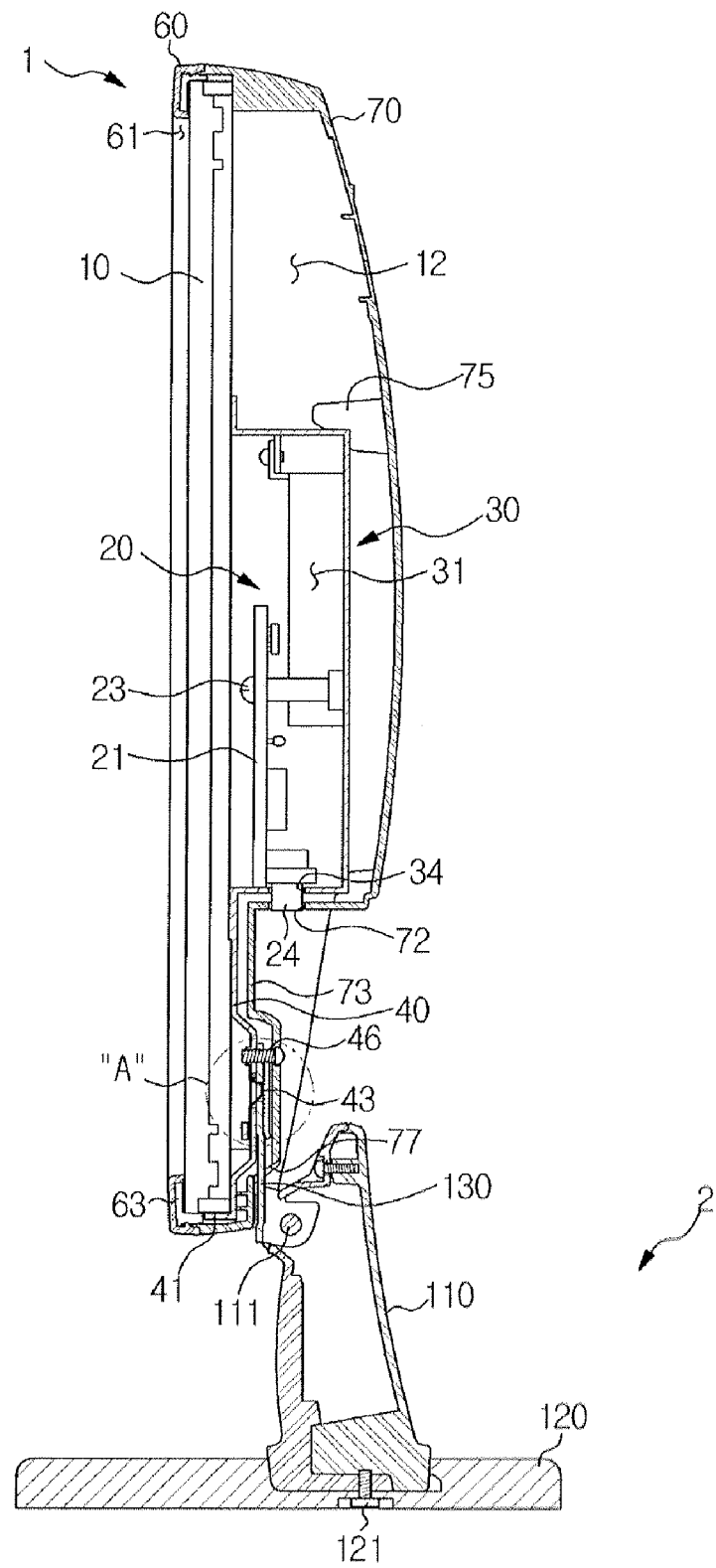
FIG. 3 is a sectional view of the display device of FIG. 1.

The body 1, as illustrated in FIGS. 2 and 3, incorporates a display panel 10, upon which an image is formed, electronic elements 20 arranged at a rear side of the display panel 10, an electromagnetic-wave shield cover 30 to receive the electronic elements 20, and a front case 60 and rear case 70 to receive and protect all of the above elements. The display panel 10 may be a Liquid Crystal Display (LCD) panel or a Plasma Display Panel (PDP), but is not limited thereto, and may be represented as another type of panel display device.

Both the front case 60 and rear case 70, as illustrated in FIG. 3, define an interior space 12 when coupled to each other, to receive the display panel 10, electronic elements 20, and electromagnetic-wave shield cover 30. Specifically, the front and rear cases 60 and 70, which are coupled to each other, enclose the display panel 10, electronic elements 20, and electromagnetic-wave shield cover 30, thereby serving to protect these elements. The front case 60 has an opening 61 to expose a screen region of the display panel 10.

Figure 4:
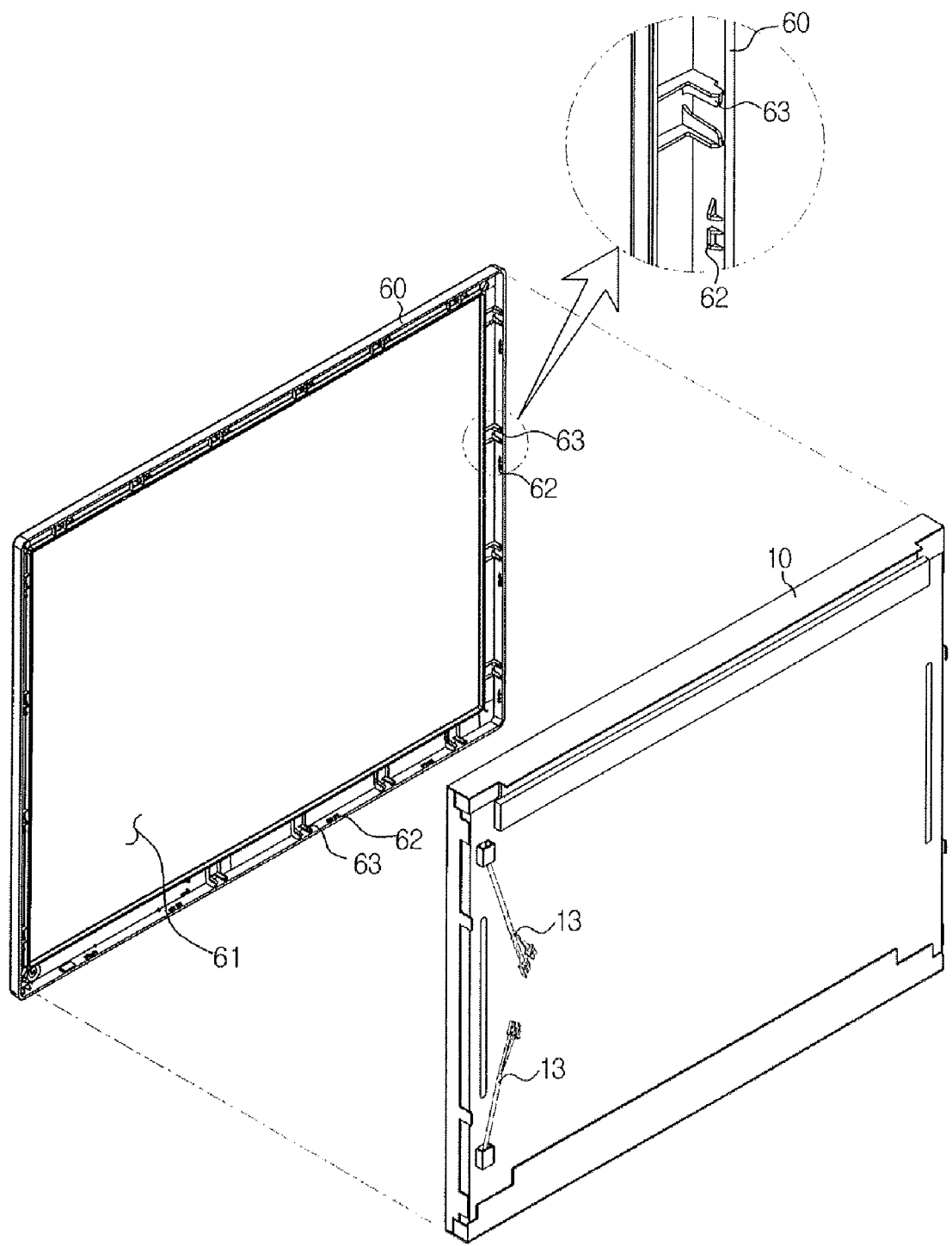
FIG. 4 is a perspective view illustrating a coupling configuration of a front case and a display panel included in the display device of FIG. 1.
Figure 6:
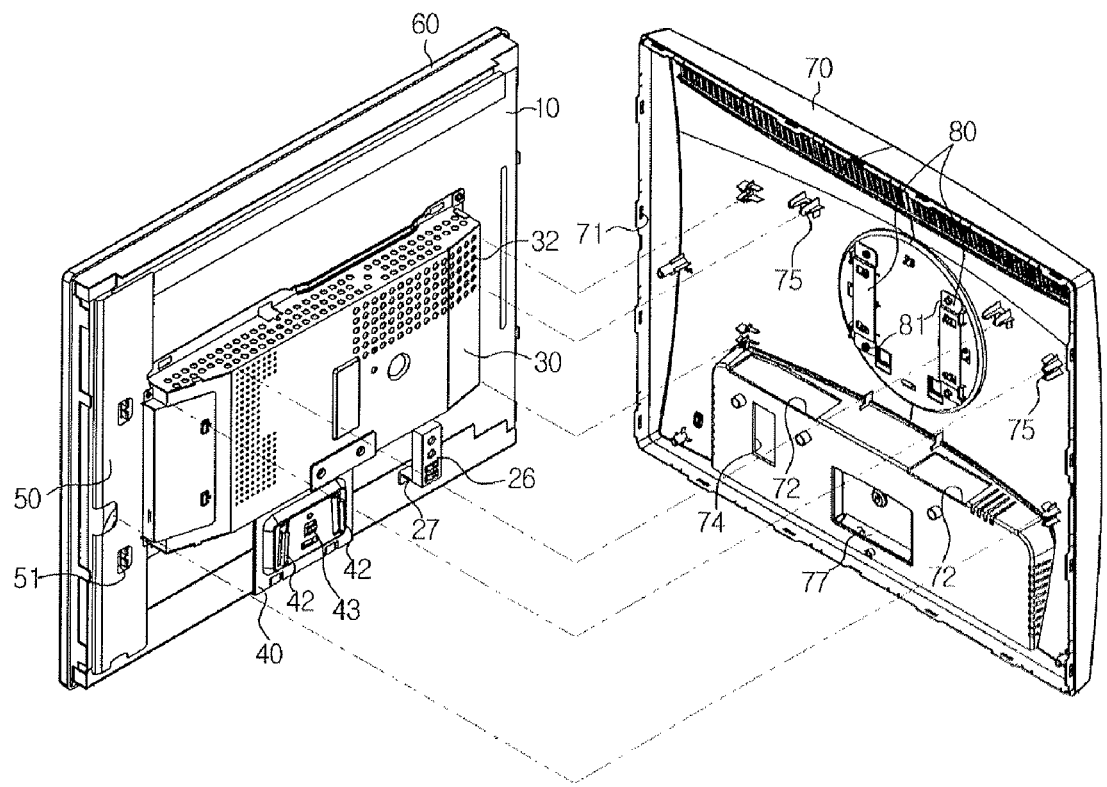
FIG. 6 is a perspective view illustrating an interior configuration of a rear case included in the display device of FIG. 1.

The front case 60 and rear case 70 have a plurality of case couplers to provide inter-coupling thereof. The case couplers include coupling protrusions 62 that protrude from an inner surface of a rim portion of the front case 60 as illustrated in FIG. 4, and coupling recesses 71 formed in a rim portion of the rear case 70 to engage and couple with the protrusions 62 as illustrated in FIG. 6. In the course of coupling the front case 60 and rear case 70 with each other, the protrusions 62 can be snap-fitted into the recesses 71, achieving rigid inter-coupling of the front case 60 and rear case 70. Here, although the present embodiment describes the case in which the protrusions 62 are provided at the front case 60 and the recesses 71 are provided at the rear case 70, their positions may be reversed. That is, the protrusions may be provided at the rear case 70 and the recesses may be provided at the front case 60.

The front case 60, as illustrated in FIG. 4, can be further provided at the inner surface of the rim portion thereof with a plurality of panel supporting pieces 63 to support a rim of the display panel 10 against movements thereof. The panel supporting pieces 63 can protrude from the inner surface of the rim portion of the front case 60 toward the rim of the display panel 10 to support the rim of the display panel 10. Accordingly, when the display panel 10 is coupled inside the front case 60, the display panel 10 has no movements as the rim of the display panel 10 is supported by the plurality of panel supporting pieces 63. In an alternative embodiment in which the rim of the display panel 10 is coupled to and supported by the rear case 70, the above-described panel supporting pieces 63 may be formed at the rear case 70.

The electronic elements 20, as illustrated in FIG. 2, may include a circuit board 21 to control operation of the display panel 10 and a power source 22 to supply power to the circuit board 21. The circuit board 21 is connected to the display panel 10 via a plurality of connecting cables extending from the display panel 10.

Figure 5:
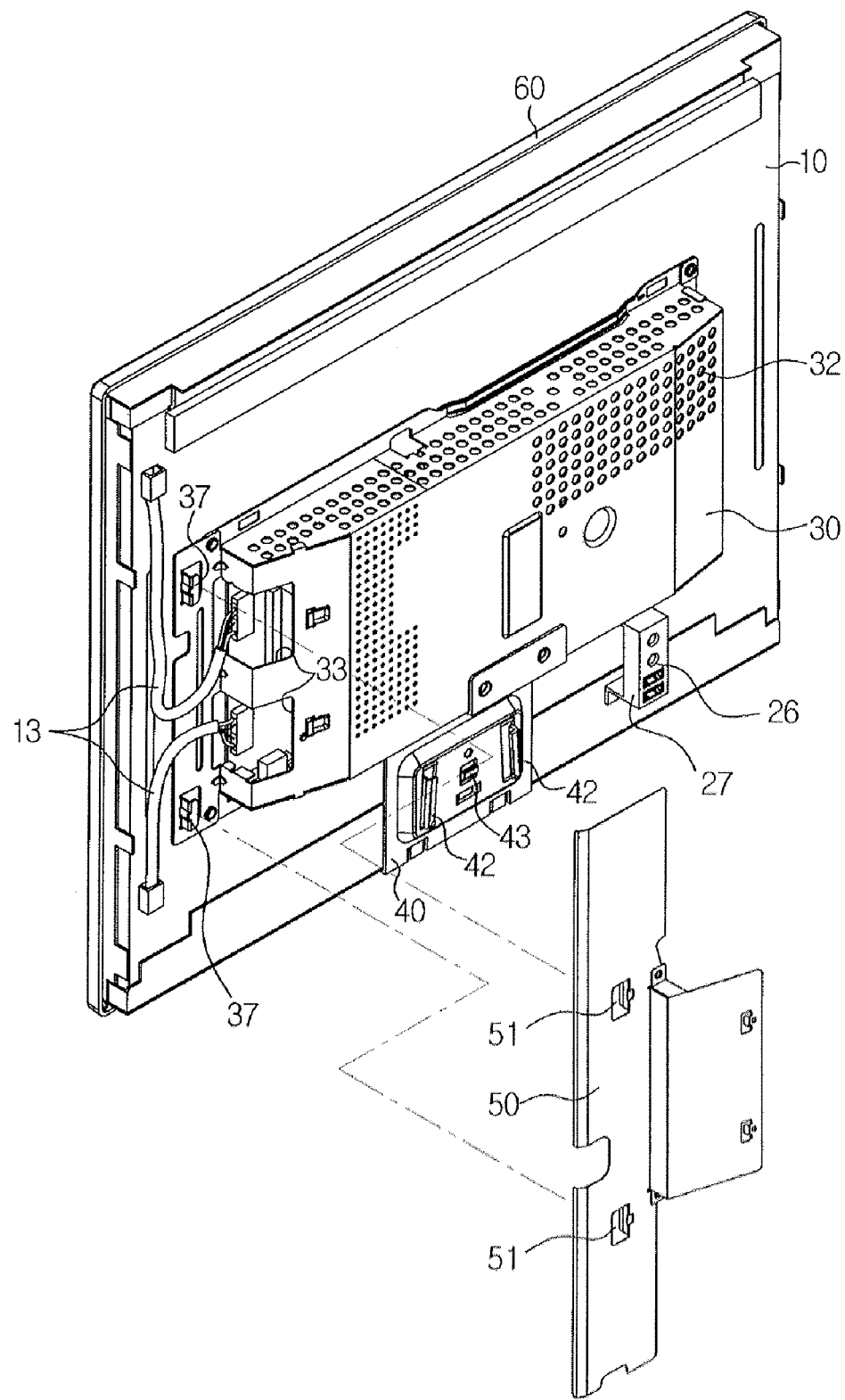
FIG. 5 is a perspective view illustrating a mounting configuration of an electromagnetic-wave shield cover and a cable cover included in the display device of FIG. 1.

The electromagnetic-wave shield cover 30 has a rectangular box shape and is made of a conductive material such as metal, etc. The electromagnetic-wave shield cover 30, as illustrated in FIG. 3, has an interior space 31 to receive the electronic elements 20. Also, a front surface of the electromagnetic-wave shield cover 30 is opened for installation and separation of the electronic elements 20. As illustrated in FIG. 5, the electromagnetic-wave shield cover 30 further has a plurality of vent holes 32, and cable openings 33, into which the connecting cables 13 from the display panel 10 are introduced.

Once the electronic elements 20 are received in the electromagnetic-wave shield cover 30, the electronic elements 20 are anchored via fastening of a plurality of fixing screws 23. Accordingly, electromagnetic-waves emitted from the electronic elements 20 can be intercepted by the electromagnetic-wave shield cover 30, and the electronic elements 20 can be protected from an external shock, etc., by the electromagnetic-wave shield cover 30. The electromagnetic-wave shield cover 30 is provided with a conductive cable cover 50 to cover the cable openings 33 into which the connecting cables 13 are introduced. Accordingly, electromagnetic-waves emitted from the connecting cables 13 as well as electromagnetic-waves leaking through the cable openings 33 can be intercepted by the cable cover 50.

As illustrated in FIGS. 2 and 3, the circuit board 21 and power source 22 are provided, at lower positions thereof, with a plurality of connection ports 24 to provide connection of external signal cables (not shown), power supply cables (not shown), etc. To expose the connection ports 24 to the outside, as illustrated in FIG. 3, the electromagnetic-wave shield cover 30 and rear case 70 are formed with a plurality of openings 34 and 72 at positions corresponding to the connection ports 24. A portion of the rear case 70 near the connection ports 24 is defined forward by a predetermined depth, to define a bent portion 73. This configuration allows easy access of the user's hand to the connection ports 24, and consequently, also provides easy connection of external cables to the connection ports 24.

In addition to the connection ports 24, auxiliary connection ports 26 are provided inside the rear case 70. The auxiliary connection ports 26 are supported by a connection port supporting member 27 extending downward from the electromagnetic-wave shield cover 30, and are connected to the electronic elements 20 via wires (not shown), etc. The rear case 70 has an opening 74 formed at a position corresponding to the auxiliary connection ports 26 to expose the auxiliary connection ports 26 to the outside. This serves to enable a general USB cable, audio signal cable, image signal cable, etc., to be connected to the auxiliary connection ports 26 from the rear side of the rear case 70. Although a case is described herein where the auxiliary connection ports 26 are arranged at a main surface of the rear case 70, the auxiliary connection ports 26 may be arranged at a lateral surface of the rear case 70 in substantially the same manner.

The rear case 70, as illustrated in FIG. 6, is formed with a plurality of cover supporting pieces 75 at an inner surface thereof. When the rear case 70 is coupled to the front case 60, the cover supporting pieces 75 push the electromagnetic-wave shield cover 30 toward a rear surface of the display panel 10, and at the same time, support the electromagnetic-wave shield cover 30 against movements thereof. The cover supporting pieces 75 protrude forward from the inner surface of the rear case 70 and support a rear-surface rim portion of the electromagnetic-wave shield cover 30. Accordingly, in a completely assembled state of the body 1, the electromagnetic-wave shield cover 30 can be kept at a fixed position by the cover supporting pieces 75.

The electromagnetic-wave shield cover 30 is provided with at least one supporting member 40. The supporting member 40 extends downward from a lower end of the electromagnetic-wave shield cover 30 and is supported by the rim of the display panel 1. The supporting member 40 can serve to determine an assembling position of the electromagnetic-wave shield cover 30. The supporting member 40, as illustrated in FIG. 3, is formed at a lower end thereof, with a bent portion 41 to be engaged with by a lower end of the display panel 10. In the course of assembling the body 1, the assembling portion (i.e. a "fixing position") of the electromagnetic-wave shield cover 30 can be accurately determined by positioning the electromagnetic-wave shield cover 30 such that the bent portion 41 of the supporting member 40 is engaged with the lower end of the display panel 10. After determining the assembling position of the electromagnetic-wave shield cover 30 using the supporting member 40, the cover supporting pieces 75 formed at the inner surface of the rear case 70 can accurately support a rim portion of the electromagnetic-wave shield cover 30 during assembly of the body 1. Differently from the above-described embodiment, if the electromagnetic-wave shield cover 30 is first assembled inside the rear case 70 and then, the display panel 10 is assembled inside the rear case 70, the assembling position of the electromagnetic-wave shield cover 30 may be determined as the lower end of the supporting member 40 is coupled to the rear case 70.

The supporting member 40 is made of a metal plate having sufficient rigidity to support the weight of the body 1 and a predetermined horizontal width. As illustrated in FIG. 3, the supporting member 40 is coupled to the external supporting device 2 used to support the body 1, and can assure the body 1 to be more stably supported by the external supporting device 2.

The external supporting device 2, as illustrated in FIGS. 2 and 3, includes a stand 110 having a predetermined length, a flat-plate-shaped base 120 coupled to a lower end of the stand 110, the base 120 having a predetermined supporting area, and a connector 130 installed at an upper end of the stand 110 and configured to be introduced into the interior of the rear case 70 so as to be coupled to the supporting member 40. The base 120 is anchored to the lower end of the stand 110 by fastening of a fixing screw 121. A lower end of the connector 130 is rotatably coupled to the upper end of the stand 110 by means of a hinge shaft 111, to adjust a screen angle of the body 1.

Figure 7:
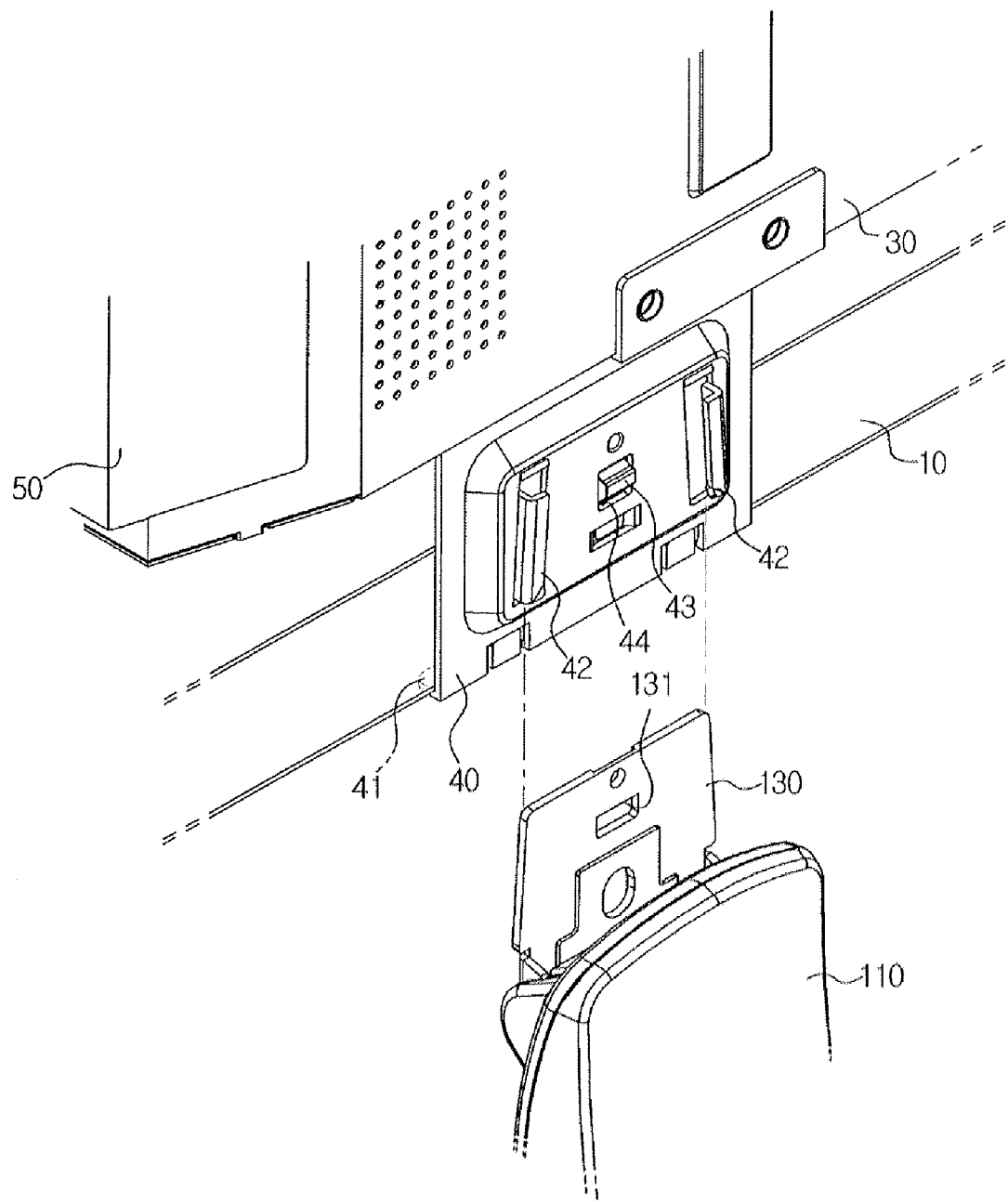
FIG. 7 is a perspective view illustrating a coupling configuration of an external supporting device and a supporting member of the display device of FIG. 1.

As illustrated in FIG. 7, the connector 130 can take the form of a flat plate, which has an insertion hole 131 perforated in the center of an upper portion thereof that will be introduced inside the rear case 70 to couple with the supporting member 40. The supporting member 40 inside the body 1 is provided, at both sides thereof, with vertically-elongated coupling rails 42 to support both sides of the connector 130 while guiding the coupling (introduction) of the connector 130.

Figure 8:
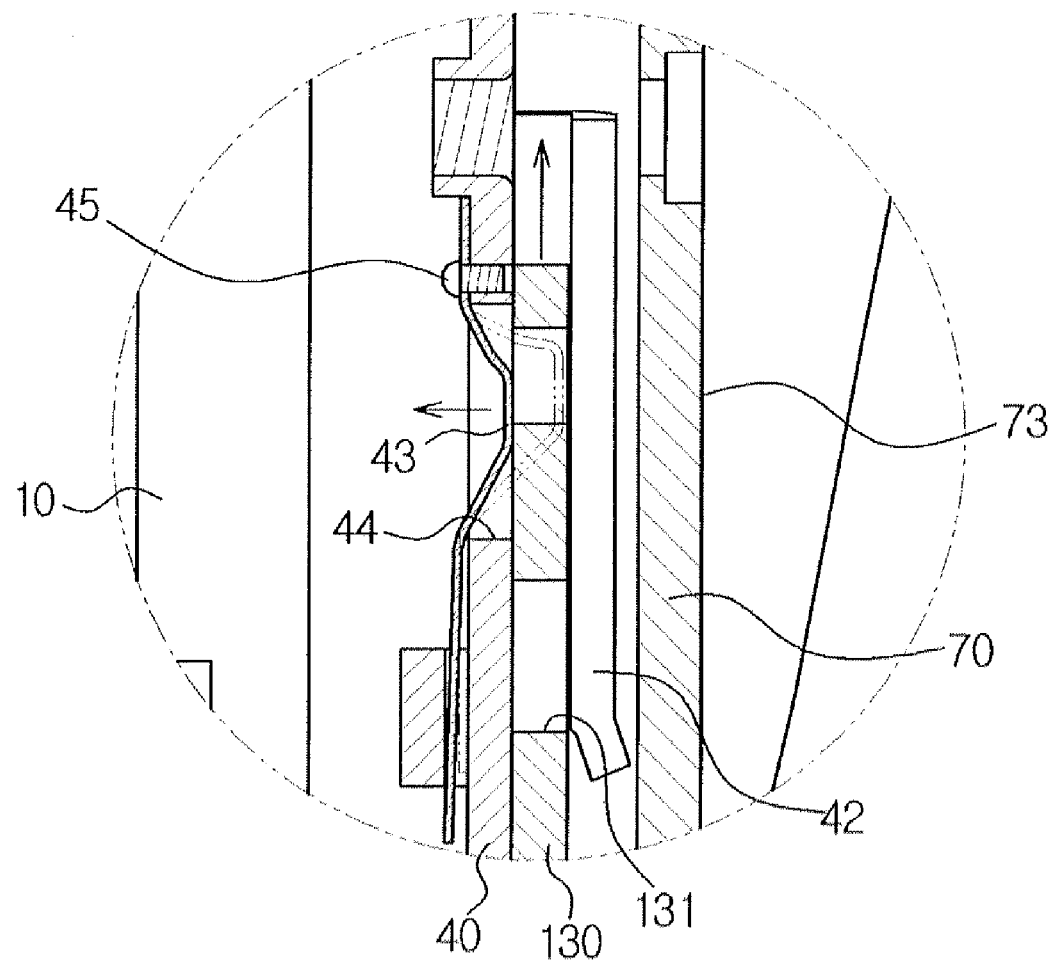
FIGS. 8 and 9 are detailed views of the portion "A" of FIG. 3, illustrating a sequential coupling procedure of a connector of the external supporting device.
Figure 9:
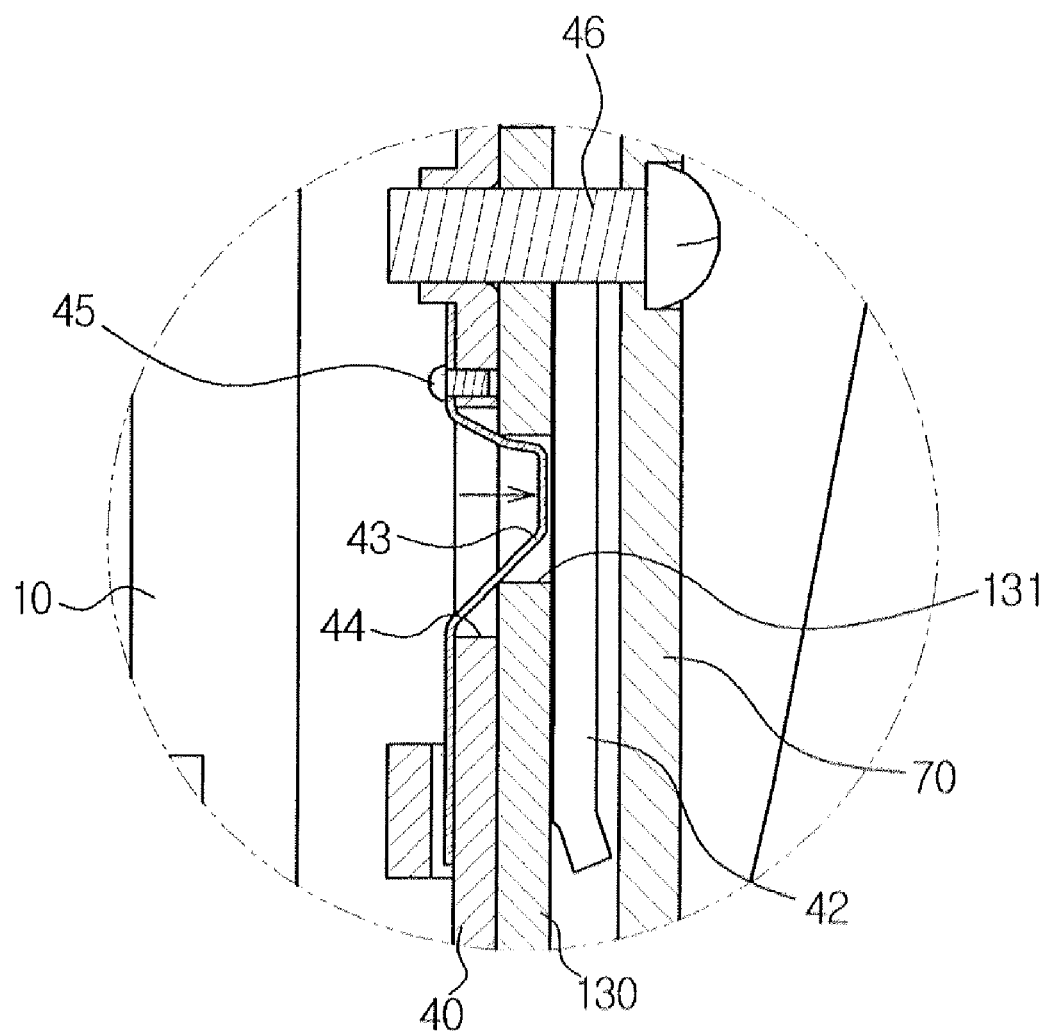

The supporting member 40, as illustrated in FIGS. 8 and 9, has an insert 43 to be introduced into and engaged by the insertion hole 131 of the connector 130 when being completely coupled with the connector 130. The insert 43 is formed by bending an elastic metal plate such that it protrudes from a hole 44 of the supporting member 40 in an introduction path of the connector 130. An upper portion of the insert 43 is anchored to the supporting member 40 by means of a fixing screw 45. Upon introduction of the connector 130, the insert 43, as illustrated in FIG. 8, is deformed by the connector 130 to permit the introduction of the connector 130. Then, after the connector 130 is completely coupled, as illustrated in FIG. 9, the insert 43 is introduced into the insertion hole 131 of the connector 130, allowing the connector 130 to be rigidly anchored to the supporting member 40. In FIG. 9, a fixing screw 46 is fastened through the rear case 70, connector 130, and supporting member 40, to anchor the connector 130 after completing the coupling of the connector 130. The use of the fixing screw 46 depends on the user's selection.

Meanwhile, the body 1 of the display device according to embodiments of the present general inventive concept may be used in conjunction with a wall hanger type external supporting device (not shown) to mount the display device to the wall, or other external supporting devices (not shown) having a different shape from the above-described embodiments. For this, the rear case 70, as illustrated in FIG. 2, is centrally formed with a plurality of coupling holes 79 perforated from the inner surface to the outer surface of the rear case 70. Also, as illustrated in FIG. 6, the rear case 70 is provided at the inner surface thereof with reinforcing plates 80 having screw-fastening holes 81 formed at positions corresponding to the coupling holes 79. With this configuration, fixing screws (not shown) to mount the external supporting device can be fastened through the coupling holes 79 into the screw-fastening holes 81 of the reinforcing plates 80.

An assembling method of the above-described panel type display device will be described.

In assembling, first, the fixing screws 23 are fastened to anchor the circuit board 21 and power source 22 to the electromagnetic-wave shield cover 30. Then, the display panel 10 is mounted inside the front case 60, and the electromagnetic-wave shield cover 30, to which the circuit board 21 and the power supply source 22 are mounted, is located at the rear surface of the display panel 10. In this case, the rim of the display panel 10 can be supported by the plurality of panel supporting pieces 63. Therefore, by simply introducing the display panel 10 inside the front case 60, the display panel 10 can be supported without movements. An assembling position (i.e. a fixing position) of the electromagnetic-wave shield cover 30 is determined by the supporting member 40.

After positioning the electromagnetic-wave shield cover 30 at the assembling position, the connecting cables 13 extending from the display panel 10 are connected to the circuit board 21. Then, the cable cover 50 is coupled to the electromagnetic-wave shield cover 30. In this case, as illustrated in FIG. 5, first coupling pieces 51 provided at the cable cover 50 are caught by second coupling pieces 37 of the electromagnetic-wave shield cover 30, to achieve easy coupling between the cable cover 50 and the electromagnetic-wave shield cover 30. Subsequently, the rear case 70 is coupled to the front case 60. As illustrated in FIG. 3, in such a coupled state of the rear case 70, the cover supporting pieces 75 formed at the inner surface of the rear case 70 can support the rear surface rim of the electromagnetic-wave shield cover 30 while pushing the electromagnetic-wave shield cover 30 toward the display panel 10. Thereby, the electromagnetic-wave shield cover 30 and display panel 10 can be anchored to each other. Also, as the coupling recesses 71 formed at the rim of the rear case 70 become engaged with the coupling protrusions 62 provided at the inner surface of the rim portion of the front case 60, the rear case 70 can be easily coupled to the front case 60 by simply pushing the rear case 70 toward the front case 60 after aligning the coupling position of the rear case 70.

As described above, a body 1 of a display device according to embodiments of the present general inventive concept can be assembled with minimum fastening of fixing screws, and therefore, can achieve a reduced number of elements and a simplified assembly process as compared to conventional display devices. Accordingly, the present general inventive concept has advantages of improved assembling productivity and reduced manufacturing costs.

When it is desired to mount the external supporting device 2 to the body 1, as illustrated in FIG. 3, the connector 130 of the external supporting device 2 is introduced through an opening 77 formed in a lower portion of the rear case 70. Thereby, as illustrated in FIGS. 7 to 9, the connector 130 is introduced along the coupling rails 42 of the supporting member 40 and engages with the coupling rails 42. After completing the engagement, as illustrated in FIG. 9, the elastic insert 43 is introduced into and caught by the insertion hole 131 of the connector 131, the connector 130 is coupled with the supporting member 40. Also, to more rigidly anchor the connector 130 to the body 1, a fixing screw 46 can be fastened from the outside of the rear case 70. The separation of the external supporting device 2 is implemented in reverse order.

As described above, a display device according to embodiments of the present general inventive concept can assure easy coupling or separation between the body 1 and the external supporting device 2, and consequently, easy storage and movement thereof. Also, in the external supporting device 2, as illustrated in FIG. 2, the stand 110 and base 120 can be easily separated from each other by unfastening the fixing screws 121. This has the effect of reducing storage and packaging volume of products.

As apparent from the above description, the embodiments of the present general inventive concept provide a panel type display device capable of assembling respective elements with minimizing fastening of fixing screws. This has the effect of reducing the total number of elements of the display device, and simplifying an assembly process of all the elements. As a result, the present general inventive concept can achieve improved productivity and reduced manufacturing costs.

Although embodiments of the present general inventive concept have been shown and described, it would be appreciated by those skilled in the art that changes may be made in this embodiment without departing from the principles and spirit of the general inventive concept, the scope of which is defined in the claims and their equivalents.

What is claimed is:

1. A panel type display device comprising:
   a display panel;
   electronic elements arranged at a rear side of the display panel;
   an electromagnetic-wave shield cover to receive the electronic elements;
   a front case and a rear case coupled with each other, to receive the display panel, electronic elements, and electromagnetic-wave shield cover;
   a plurality of panel supporting pieces provided at at least one of the front case and rear case to support the display panel;
   at least one supporting member extending from the electromagnetic-wave shield cover and supported by at least one of a rim of the display panel and an inner surface of the rear case to determine an assembling position of the electromagnetic-wave shield cover; and
   a plurality of cover supporting pieces provided at the inner surface of the rear case to support the electromagnetic-wave shield cover without movements while pushing the electromagnetic-wave shield cover toward a rear surface of the display panel.

2. The device according to claim 1, further comprising:
   a plurality of case couplers provided at rims of the front case and rear case to allow the front case and rear case to engage with and couple to each other.

3. The device according to claim 2, wherein the plurality of case couplers include coupling protrusions provided at one of the front case and rear case and coupling recesses provided at the other one of the front case and rear case to engage with the coupling protrusions.

4. The device according to claim 1, wherein the plurality of panel supporting pieces protrude from an inner surface of a rim portion of at least one of the front case and rear case to support the rim of the display panel.

5. The device according to claim 1, wherein
   the electromagnetic-wave shield cover has a box shape internally defining a space to receive the electronic elements, and
   the electronic elements are anchored in the electromagnetic-wave shield cover via fastening of a plurality of fixing screws.

6. The device according to claim 1, wherein
   the electronic elements include at least one circuit board and at least one power source,
   each of the circuit board and power source has at least one connection port formed at a lower position thereof for connection of at least one external cable, and
   each of the electromagnetic-wave shield cover and rear case has at least one opening formed at a position corresponding to the connection port.

7. The device according to claim 6, wherein a portion of the rear case near the connection port is bent forward by a predetermined depth to define a bent portion.

8. The device according to claim 1, further comprising:
   at least one connecting cable to connect the electronic elements to the display panel; and
   at least one cable cover to cover the connecting cable in order to intercept electromagnetic-waves around the connecting cable,
   wherein the electronic elements include at least one circuit board and at least one power source.

9. The device according to claim 1, further comprising:
   at least one auxiliary connection port installed inside the rear case toward at least one of the main surface and lateral surface of the rear case to provide a connection of an external cable, the auxiliary connecting port being linked with the electronic elements; and
   a connection port supporting member extending from the electromagnetic-wave shield cover to support the auxiliary connection port,
   wherein the rear case has at least one opening formed at a position corresponding to the auxiliary connection port.

10. The device according to claim 1, wherein the plurality of cover supporting pieces protrude from the inner surface of the rear case to support a rear surface rim portion of the electromagnetic-wave shield cover.

11. A panel type display device comprising:
    a body; and
    an external supporting device to support the body,
    wherein the body includes a display panel, electronic elements arranged at a rear side of the display panel, an electromagnetic-wave shield cover to receive the electronic elements, a front case and a rear case coupled with each other to receive the display panel, electronic elements, and electromagnetic-wave shield cover, and at least one supporting member extending from the electromagnetic-wave shield cover and supported by at least one of a rim of the display panel and an inner surface of the rear case to determine a fixing position of the electromagnetic-wave shield cover.

12. The device according to claim 11, wherein the external supporting device includes a stand, a base coupled to a lower end of the stand, and a connector extending from an upper end of the stand, the connector being configured to be introduced inside the rear case so as to be coupled to the supporting member.

13. The device according to claim 12, wherein
    the connector has a flat-plate shape having at least one insertion hole, and
    the supporting member extends downward from a lower end of the electromagnetic-wave shield cover and includes coupling rails provided at both sides thereof, respectively, to support both sides of the connector while guiding a coupling of the connector, and an elastically deformable insert to be introduced into and caught by the insertion hole when completing the coupling of the connector.

14. The device according to claim 12, wherein the base is anchored to the lower end of the stand by fastening at least one fixing screw.

15. The device according to claim 11, wherein the rear case includes a plurality of coupling holes to mount the external supporting device, and at least one reinforcing plate coupled to the inner surface of the rear case and having screw-fastening holes formed at positions corresponding to the coupling holes.

16. The device according to claim 11, wherein the body further includes:
    a plurality of panel supporting pieces configured to protrude from an inner surface of a rim portion of at least one of the front case and rear case toward the rim of the display panel to support the display panel.

17. The device according to claim 11, wherein the body further includes:
    a plurality of cover supporting pieces protruding from the inner surface of the rear case to support the electromagnetic-wave shield cover without movements while pushing the electromagnetic-wave shield cover toward a rear surface of the display panel.

18. A panel type display device comprising:
a display panel;
an electromagnetic-wave shield to cover electric elements disposed at a back portion of the display panel;
a front case to receive the display panel in an opening thereof, the front case having panel supporting pieces disposed around the opening thereof to support the display panel from movements within the opening and coupling protrusions extending therefrom; and
a rear case including coupling recesses disposed along an outer periphery thereof to engage with and couple to the coupling protrusions and cover support pieces extending from a front portion thereof to surround and support the electromagnetic-wave shield when the rear case couples to the front case.

19. The panel type display device according to claim 18, further comprising:
at least one supporting member extending from the electromagnetic-wave shield cover and supported by at least one of a rim of the display panel and an inner surface of the rear case to determine an assembling position of the electromagnetic-wave shield cover.

20. The panel type display device according to claim 19, wherein the at least one supporting member comprises:
a bent portion at a lower end thereof to engage with a lower end of the display panel to determine an assembling position of the electromagnetic-wave shield cover; and
a coupling device to couple with a supporting device.

21. The panel type display device according to claim 20, further comprising:
an external supporting device including
a base, and
a stand extending from the base, the stand including a connector extending from the stand to engage with and couple to the coupling device and an insertion hole.

22. The panel type display device according to claim 21, wherein coupling device comprises:
a pair of vertically-elongated coupling rails to engage with the connector of the stand; and
an insert disposed between the vertically-elongated coupling rails to be inserted into the insertion hole to fixedly position the stand with respect to the at least one supporting member.

* * * * *